(12) United States Patent
Kaufer et al.

(10) Patent No.: US 11,122,434 B2
(45) Date of Patent: Sep. 14, 2021

(54) METHOD FOR DELEGATING ACCESS RIGHTS

(71) Applicant: HUF HÜLSBECK & FÜRST GMBH & CO. KG, Velbert (DE)

(72) Inventors: Uwe Kaufer, Duisburg (DE); Benedikt Rehder, Velbert (DE); Fabian Lanze, Dusseldorf (DE); Michael De Paly, Dortmund (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 74 days.

(21) Appl. No.: 16/626,055

(22) PCT Filed: May 14, 2018

(86) PCT No.: PCT/EP2018/062403
§ 371 (c)(1),
(2) Date: Dec. 23, 2019

(87) PCT Pub. No.: WO2019/007574
PCT Pub. Date: Jan. 10, 2019

(65) Prior Publication Data
US 2020/0252801 A1    Aug. 6, 2020

(30) Foreign Application Priority Data

Jul. 7, 2017 (DE) ............ 10 2017 115 298.9

(51) Int. Cl.
*H04L 29/06* (2006.01)
*H04W 12/084* (2021.01)
(Continued)

(52) U.S. Cl.
CPC ...... *H04W 12/084* (2021.01); *G06F 21/6209* (2013.01); *H04L 9/083* (2013.01);
(Continued)

(58) Field of Classification Search
CPC ... H04W 12/084; H04W 4/40; G06F 21/6209; H04L 9/083; H04L 2209/80
See application file for complete search history.

(56) References Cited

U.S. PATENT DOCUMENTS

| | | | |
|---|---|---|---|
| 8,412,934 B2* | 4/2013 | De Atley | ............ G06F 11/1469 713/165 |
| 2011/0197064 A1* | 8/2011 | Garcia Morchon | ........................ H04W 12/041 713/168 |

(Continued)

FOREIGN PATENT DOCUMENTS

| | | |
|---|---|---|
| DE | 10 2011 078 018 A1 | 12/2012 |
| DE | 10 2014 217 899 A1 | 3/2016 |

(Continued)

OTHER PUBLICATIONS

International Preliminary Report on Patentability of International Application No. PCT/EP2018/062403 dated Jan. 16, 2020, (with English Translation) 15 pages.

(Continued)

*Primary Examiner* — Shawnchoy Rahman
(74) *Attorney, Agent, or Firm* — Fay Sharpe LLP (57) ABSTRACT

A method for delegating access rights to a secured object includes generating a first-order data packet in a trusted central management device. The data packet contains a first identifier, a first data set having access rights to a secured device and a first data secret key for encryption and signature. A second-order data packet is signed via the first data secret key and is created in the first mobile communication device and contains a unique identifier, reference data, a second data set having access rights, a second data secret key for encryption and a first data container. The first data container is encrypted via the first data secret key and contains the first identifier and the second data secret key.

(Continued)

The signed second-order data packet is transmitted to a second mobile communication device of a second user.

12 Claims, 4 Drawing Sheets

(51) Int. Cl.
| | | |
|---|---|---|
| *H04W 4/40* | (2018.01) | |
| *G06F 21/62* | (2013.01) | |
| *H04L 9/08* | (2006.01) | |
| *H04W 12/0431* | (2021.01) | |
| *H04W 4/80* | (2018.01) | |
| *B60R 25/20* | (2013.01) | |
| *B60R 25/24* | (2013.01) | |

(52) U.S. Cl.
CPC ......... *H04W 4/40* (2018.02); *H04W 12/0431* (2021.01); *B60R 25/209* (2013.01); *B60R 25/24* (2013.01); *B60R 2325/108* (2013.01); *B60R 2325/205* (2013.01); *H04L 2209/80* (2013.01); *H04W 4/80* (2018.02)

(56) References Cited

U.S. PATENT DOCUMENTS

| | | | |
|---|---|---|---|
| 2013/0259232 A1 | 10/2013 | Petel | |
| 2017/0257377 A1* | 9/2017 | Vading | H04L 63/108 |
| 2020/0177375 A1* | 6/2020 | Buck | H04L 9/14 |

FOREIGN PATENT DOCUMENTS

| | | |
|---|---|---|
| DE | 10 2014 219 502 A1 | 3/2016 |
| DE | 20 2016 107 487 U1 | 5/2017 |
| DE | 10 2015 122 469 A1 | 6/2017 |
| EP | 1 662 698 A1 | 5/2006 |
| EP | 1 910 134 A2 | 4/2008 |
| WO | WO 2015/176826 A1 | 11/2015 |

OTHER PUBLICATIONS

International Search Report of International Application No. PCT/EP2018/062403 dated Jul. 26, 2018, 5 pages.

* cited by examiner

METHOD FOR DELEGATING ACCESS RIGHTS

BACKGROUND

The invention relates to a method for delegating access rights to secured objects. In particular, the invention relates to a method in which individual access privileges relating to secured objects are distributed to mobile communication devices of individuals and forwarded (delegated) by these individuals from their mobile communication devices to the mobile communication devices of other individuals.

The management of access rights or user rights can be found in many areas of technology. For example, there are complex rights hierarchies and schemas for managing access privileges in computer systems. There, an individual who identifies himself to the computer system, for example by using a secret identifier or biometric data, is granted access to services or data of the computer system. If the assigned rights or privileges are not sufficient to carry out an action requested by the individuals, the execution is prevented by technical measures.

In other areas of the art, locking systems are known in which access control locking means are carried by individuals and identified so as to check access to a function, such as access to an area. These may include, for example, vehicle keys with electronic communication components or key cards for access systems. In the field of individual vehicle use, keyless entry and keyless go systems can be mentioned here, for example. In these systems, a user carries a vehicle key called an ID transmitter. This ID transmitter contains coded information that legitimizes to a vehicle the authorization of the carrier of the ID transmitter to perform a function. Such an ID transmitter can easily be passed on to other individuals, so that they are also able to call up and confirm the vehicle functions with the ID transmitter.

In addition, it is known to use not only the electronic ID transmitters supplied with vehicles, but also other electronic devices as a means of legitimating access to the vehicle and triggering vehicle functions. For example, US 2013/0259232 A1 describes a system for coupling or pairing a mobile phone with a vehicle in order to be able to control vehicle functions using the mobile phone.

DE 10 2011 078 018 A1 describes a system for carrying out vehicle functions, in which a telematics center carries out part of the communication with the vehicle.

From EP 1 910 134 B1 a system is known which comprises a central management device which distributes data packets as keys to mobile access devices.

Finally, WO 2015/176826 discloses a rights management and assignment system in which a central management unit communicates with both mobile communication devices and with control devices in the protected objects and coordinates the distribution of access rights.

However, the known methods do not satisfactorily utilize the full advantages of intangible access authorization. Whereas in a vehicle key, sharing a key always implies relinquishment, duplicating access rights from a first owner's mobile communication device to a second user's mobile communication device can theoretically provide significant comfort and usage benefits for vehicle use. It is not necessary to duplicate a physical object or to keep a plurality of keys in stock, instead the key information can be passed as intangible data. On the other hand, such a delegation of rights poses problems, since it must be ensured at all times that with respect to the object to be protected it remains verifiable as to whether the user has actually obtained the access rights by deliberate delegation of a rights holder or if he has illegally acquired them, for example by copying the data.

The object of the invention is to provide an improved method for the delegation of access rights to protected objects.

BRIEF SUMMARY

This object is achieved by a method having the features of patent claim 1 and a method having the features of patent claim 7.

According to the invention, mobile communication devices are used which users of an object to be secured, for example a car, a house, a safe or any other protected device, carry on their person. These mobile communication devices are used to store the access rights. The mobile communication devices are designed so that they can communicate with the object to be protected through data exchange, for example by way of a short-range wireless radio link (e.g. Bluetooth or WLAN or NFC).

According to the invention, the access rights are first transmitted to a first-order primary user, namely to the first mobile communication device of this user. For this purpose, a central administrative unit, for example a trustworthy server accessible via the Internet as a rights manager, provides a first-order data packet. This first-order data packet contains a unique identifier which uniquely identifies the data packet among all the data packets issued by the central management device. Furthermore, a first data set is added to the first data packet, the data set containing a list of access rights to at least one specific secured device. This first data set may be a one-dimensional or multi-dimensional list which at least indicates which functions may be operated by the owner of this data packet and which functions are disabled.

Furthermore, the first-order data packet contains a first data secret which can be used for encrypting and decrypting data. For example, the data secret may be a string used for encryption.

This first-order data packet is assigned to the first mobile communication device of the first-order user. First-order users may be, for example, an owner or tenant of the object to be secured, such as a lessee or a customer of a vehicle rental company who has rented a vehicle.

The first-order data packet is stored in the first-order user's mobile communication device and the first-order user can access the object to be secured with this first-order data packet. According to a first aspect of the invention, the first-order data packet is also transmitted from the central management device to a control device of the secured device for this purpose. This transmission can take place via a public communications network, for example. The first-order data packet is stored in the control device and thus the same information is available both to the user using his mobile communication device and to the control device in the object to be secured. According to this information, a user can legitimize himself to the control device of the object to be secured, in particular since it is possible for the control device of the object to be secured to check the content of the data packet using the unique identifier and further data contents.

An essential aspect of the invention is that a delegation of usage data to other persons of subordinate rank and their respective communication device is possible without the involvement of the central management device. This is particularly important if a communication connection with the central management device is not possible between a first-order subscriber using his first mobile communication device. Such offline authorization delegation may become necessary if, for example, the first mobile communication device cannot reach a public communication network. Even in such a case, it should be possible for another user to pass on such access rights (or a restricted part thereof) that have been assigned to the first-order user.

For this purpose, what is provided according to the invention is that a second-order data packet is prepared in the first mobile communication device of the first-order user. This second-order data packet comprises both data of the first data packet and newly created data. In particular, the second-order data packet comprises a unique second identifier and first reference data which contain a reference to the first-order data packet. The reference data thus indicate from which first-order data packet this second-order data packet is derived. In addition, a second data set is included in the second-order data packet, with a listing of access rights to the secured device, wherein the second data set is a subset of the first data set. A subset in this context is understood to mean that the access rights contained cannot go beyond the rights contained in the access rights of the first data set in the first-order data packet.

Furthermore, a second data secret is contained in the second-order data packet, the second data secret being usable for encrypting and decrypting data. These data are always contained in the second-order data packet in readable format. Furthermore, the second-order data packet contains an encrypted data container containing data which contains at least the unique first identifier and also the second data secret. This container data must be encrypted using the first data secret and decrypted only for an owner of the first data secret.

Furthermore, the second-order data packet is signed using the first data secret.

This second-order signed data packet is transmitted by the first mobile communication device to a second mobile communication device which is assigned to a second-order user. The transmission can in particular be wireless, via Bluetooth or NFC or via WLAN.

This second communication device is hierarchically subordinate to the first communication device with regard to second-order access rights once the data packet is forwarded. The second communication device derives its access rights from a transfer of access rights by the first communication device. The method according to the invention facilitates the derivation of user rights of an authorized user who has received a first-order data packet from a central management device. Since according to this aspect of the invention this data packet has been sent to both the first-order user's first mobile communication device and the control device of the secured device, these two systems have access to the first-order data packet. It should be noted, however, that the second-order data packet is generated by the first mobile communication device and not by the central management device or by the control device in the secured device. The first-order user is able, using his first mobile communication device and based on his own rights, to initiate secure and verifiable transfer of rights to a second-order user with a second mobile communication device. According to the invention, this chain can be continued, and derivation can be performed from the second-order user to further subordinate users. It is essential that for the control device of the secured device the proper derivation of the rights remains verifiable by the first user. This is done by the encrypted containers that are added to each level of rights transfer.

It is clear from the above that, although the first data secret is present in the first-order data packet and is therefore present in the first mobile communication device and the control device of the object to be protected, this data secret is not contained in the second-order data packet. Rather, the first data secret has only been used to encrypt the container in the second-order data packet and to sign the data packet. However, in this way the second mobile communication device has access to data which is not accessible to the device itself in readable form, but which can be decrypted for the object to be protected using the first data secret available there. The data in the data container then serve to verify the proper assignment of a rights hierarchy and the verification of authenticity. This is because the signature together with the first-order data secret ensures that the data structure in the second-order data packet has not been changed or corrupted.

The invention is thus based on a concept of forming a chain of authorizations with a hierarchical structure, wherein data from higher hierarchical levels are transmitted to each downstream user and his mobile communication device, not all of the data being readable by the participants of the subordinate hierarchy level and in particular cannot be modified since the data carry the signature of the higher hierarchical level. In this way, a chain of authorizations can be created, which remains verifiable at any time for the control device of the object to be secured, even if the delegation of rights is done without the knowledge or control of the object to be secured and its control device and without the knowledge of the central administrative device.

The structure of the data packets is customizable to the conventional and common encodings of data packets as required. In particular, the use of the invention is not limited to any particular type of data encoding. When referring to data sets, what is meant in particular is a data list or a data array which is used for structured data transmission. The term "data secret" is to be understood in general as any character string or data structure which allows the encryption and signature of a data packet. In this case, the data secret can be quite complex, in particular it can contain several sections of data that are used for different purposes.

The transmission of the data on the one hand from the central management device to the mobile communication devices and the control device of the secured device and on the other hand from a mobile communication device to another mobile communication device is carried out according to the established data transmission method. For example, a transmission can take place via a public data network or by short-range radio links. The data connections and data transmissions can be encrypted at any time using the established procedure or otherwise secured.

For the purposes of this invention, mobile communication devices means any device which can be carried by the user, in particular mobile telephones and portable computers, as well as other communication-capable devices (e.g. wearables).

In one development of the invention, the first data set in the first-order data packet, together with the list of access rights, contains delegation authorizations associated with this access information, the authorizations indicating which of the listed access rights can be delegated to hierarchically subordinate communication devices.

According to this embodiment of the invention, it is provided that the transferring of access rights to the secured device can be restricted, which is represented by the delegation authorizations in the first data set. For example, if the secured object is a vehicle, separate access rights for access to the vehicle, for example the opening of the driver's door on the one hand and the opening of the tailgate on the other hand, can be assigned separately using delegation authorizations. For example, a user of a vehicle may have the right to delegate the access authorization for opening the tailgate, but not the authorization for opening the driver's door. The same applies to starting the engine or driving the vehicle at certain times of the day, for example. In this way, on the one hand each mobile communication device involved in the assignment of rights, and on the other hand the control device of the secured object can verify whether the rights transferred should actually have been transferred.

According to a preferred embodiment of the invention, the first data secret and/or the second data secret each contain a plurality of components, so that for encryption using a data secret a different component of the data secret can be used than is used for the signature using the respective data secret.

As stated above, both encryption and signature are performed using the first data secret. According to the preferred embodiment described here, different components of the first data secret can be used for the signature on the one hand and for the encryption on the other. In this sense, the data secret thus contains a plurality of components that are to be used for encryption and signatures.

According to a preferred embodiment of the invention, the method according to the invention comprises further steps for transferring the rights from the second-order user and his second mobile communication device to a third-order user and a mobile third communication device associated therewith. For this purpose, a third-order data packet is provided (generated) in the second mobile communication device, the third-order data packet containing at least one unique third identifier and second reference data containing a reference to at least one of the first-order and/or second-order data packets. In addition, in the third-order data packet, there is included a third data set having a list of access rights to a secured device, the third data set being a subset of the second data set. Furthermore, the first data container encrypted with the first data secret is included, so this container is received from the second-order data packet. In addition, a second data container encrypted with the second data secret is included, the second container receiving at least the unique second identifier, The third-order data packet is signed using the second data secret in the second mobile communication device and is transmitted as a third-order signed data packet to a third mobile communication device. This third mobile communication device is assigned to a third-order user who is hierarchically subordinate to the second-order user with regard to the usage rights of the secured object.

According to this further expansion stage of the invention, it is possible to delegate the rights without further intervention of the first-order user and his first mobile communication device, moreover, without intervention of the central management device and also without the involvement of the control device of the secured object. It can be seen that the encrypted data container is forwarded from the higher hierarchy levels, namely the second mobile communication device, a data container being attached and thus the third mobile communication device receiving the encrypted data container from the previous hierarchy levels. It should be noted that the data containers are each encrypted with different data secrets and are not readable for the third mobile communication device.

However, when the secured object is accessed, after data exchange with each of the mobile communication devices and after transmission of the data packet the control unit is in a position to decrypt at least at first the container that had been encrypted using the first data secret which was also transmitted to the control device of the secured device. Since the second data secret with which the container of the next, subordinate hierarchical level was encrypted is in turn located in this container, a successive decryption of the container and verification of the signatures is possible. The control device of the object to be secured merely needs to know the content of that data packet it has at the beginning, the references in the data packets being useful for this purpose.

According to a preferred embodiment of the invention, access to the secured object is realized using the second communication device. The second communication device has received the second-order data packet from the first communication device of the primary user. A second-order user with his second mobile communication device approaches the control device of the secured device, and in particular initiates a data communication with the latter, In this case, the second-order data packet is transmitted from the second mobile communication device to the control device of the secured device. The control device reads out the first reference data from the second-order data packet and calls up within the control device the contents of the first-order data packet referenced by these first reference data. It should be recalled that the first-order data packet was transmitted from the central management device to the control device of the object to be secured. In particular, after calling up this data packet, the control device of the object to be secured is in possession of the first data secret and thus verifies the signature of the second-order data packet which it has received from the second mobile communication device. After successful verification, the first data container originating from the second-order data packet is decrypted in the control device using the first data secret. Following this, the unique identifier from the decrypted container can be verified and the second data secret can also be stored in the control device of the object to be secured if a hierarchical delegation should be provided over more than one level. Finally, the access rights from the second data set of the second-order data packet are verified on the basis of the access rights from the first data set, so that a check is performed as to whether the access rights are within the scope of the delegable rights of the first-order data packet.

If all of these checks are successful, the control device of the object to be secured secures the access rights from the second data set as the access right of the second communication device. In this way, second-level user access to the object to be secured has been delegated in a secure manner without a connection having taken place prior to accessing the object.

Analogously, in a preferred embodiment of the invention, access to the object to be secured by a third-order user is accomplished using a third mobile communication device. Again, a connection is established between the third mobile communication device and the control device of the secured device. The third-order data packet is transmitted from the third mobile communication device to the control device of the secured device. Since the reference data are unencrypted and readable, the control device of the secured object can read this reference data and locate the data packets of higher order stored in the control device. It may well be that both a first-order data packet and a second-order data packet already exist in the control device, but in any case there is the first-order data packet which has been transmitted from the central management device to the control device of the secured object. Subsequently, the first data container in the control device is decrypted using the first data secret from the first-order data packet. This data packet contains the second data secret, which now checks the signature of the third-order data packet. If this check of the signature has been successful, the identifier from the decrypted first data container is checked. This code can be tested against the identifier which was received from the central management unit in the first-order data packet in the control device of the secured object.

Finally, the access rights from the third data set are verified on the basis of the access rights from the first data set, in particular as to whether the access rights do not exceed the delegable access rights according to the first-order data packet. If this is the case, the access rights from the third data set are stored in the control device of the secured object as access rights of the third communication device.

According to the above description, it becomes clear that stepwise decryption and checking according to the inventive method is possible, namely by way of successive decryption of the data containers and the decryption of subordinate data containers from the data packets with the data secrets which are contained in the previously decrypted data containers. This chain of data containers allows the control device of the secured device to verify the usage rights.

According to a further aspect of the invention, provision is also made for the transmission of the first data packet from the central management device to the control device of the secured object via the mobile communication devices.

This aspect of the invention is particularly useful when no data transmission between the central management device and the control device of the object to be secured is possible, for example because the object to be secured is temporarily unavailable. In the case of a vehicle, this may for example be the case when the vehicle is parked in an underground garage.

According to this aspect of the invention, the transmission of the first data packet is done in an encrypted data container which is transmitted from the central management device to the first mobile communication device. In contrast to the first aspect of the invention, this data container is contained in the first data packet, but is already encrypted with a key which is assigned to the control device in the secured object. Accordingly, the contents of this data container cannot be decrypted for the first mobile communication device and is thus not accessible. Instead, this container is added to the data packets through all inheritance levels of the rights delegation.

If in the control device of the secured object a data packet of second or third or further subordinate order is then transmitted from a mobile communication device, the control device of the secured object is able to decrypt the data container with its stored specific key and subsequently carry out the method according to the first aspect of the invention. Thus, this aspect of the invention differs from the first aspect of the invention in that no direct transmission takes place from the central management device of the first data packet to the control device of the secured object, but this data transmission is realized together with the other data packets without anyone in this way receiving access to the transported data container.

The method according to the second aspect of the invention proceeds as follows:

First, a first-order data packet is created in a trusted central management device, wherein the first-order data packet initially contains a unique first identifier and a first data set with a list of access rights to a secured device. Furthermore, the first-order data packet contains a first data secret which can be used for encrypting and decrypting data.

This first-order data packet is encrypted in the trusted central management device, wherein a first object data secret that is specific to the control device of the secured object is used for encryption. This first object data secret is assigned to the control device of the secured object, wherein at least one second object data secret is stored on this control device, the first object data secret and the second object data secret being coordinated with one another such that for the control device of the secured object the first-order data packet encrypted with the first object data secret can be decrypted using the second object data secret.

Basically, in symmetric encryption, there may be an identity between the first object data secret and the second object data secret, but it may also be asymmetric encryption with different data secrets.

The unencrypted first-order data packet is transmitted along with the first-order encrypted data packet to a mobile communication device assigned to a first-order user.

The first mobile communication device is thus in possession of identical information in encrypted and decrypted form, wherein it cannot itself access the encrypted information because it lacks the second object data secret for decryption. If the first-order user wishes to delegate access rights to the secured device, he provides a second-order data packet in the first mobile communication device. Again, the second-order data packet contains a unique second identifier as well as first reference data which refer to the origin of the data packet, in particular to the first-order data packet. Furthermore, a second data set is included which contains a listing of access rights to the secured device, wherein the second data set is a subset of the first data set. Finally, again, a second data secret is included which is usable for encrypting and decrypting data.

Furthermore, the second-order data packet contains the first-order data packet encrypted with the first object data secret. This data packet is thus added to the second-order data packet and is unreadable for all mobile communication devices. Finally, a first data container encrypted with the first data secret is also included, the first data container receiving at least the unique first identifier and the second data secret. The second-order data packet is signed using the first data secret. Finally, the second-order signed data packet is transmitted to a mobile second communication device associated with a second-order user, the second communication device being hierarchically subordinate to the first communication device.

According to this aspect of the invention, different data containers are present in the data packet in the second communication device, one of these data containers being readable exclusively by the control device in the secured object. This container then in turn contains information required to decrypt the additional data container, and this information is encrypted with the first data secret.

In this way, the transfer of the information required for the control device of the secured object can also be transmitted without connection between the central management device and the control device of the secured object.

If a second-order or third-order user approaches the secured object with his second mobile communication device or third mobile communication device for access, the respective data packets are transmitted to the control device of the secured object. Then the control device of the secured object first decrypts the container using the stored second object data secret, the container which was encrypted using the first object data secret. Once this has taken place, the control device of the secured object in its database is placed in a state as would be present according to the first aspect of the invention in the case of a connection between the central management device and the control device of the secured object. The following verification steps accordingly also correspond to the method explained above.

BRIEF DESCRIPTION OF THE DRAWINGS

The invention will now be explained in more detail with reference to the accompanying drawings.

DETAILED DESCRIPTION

Figure 1:
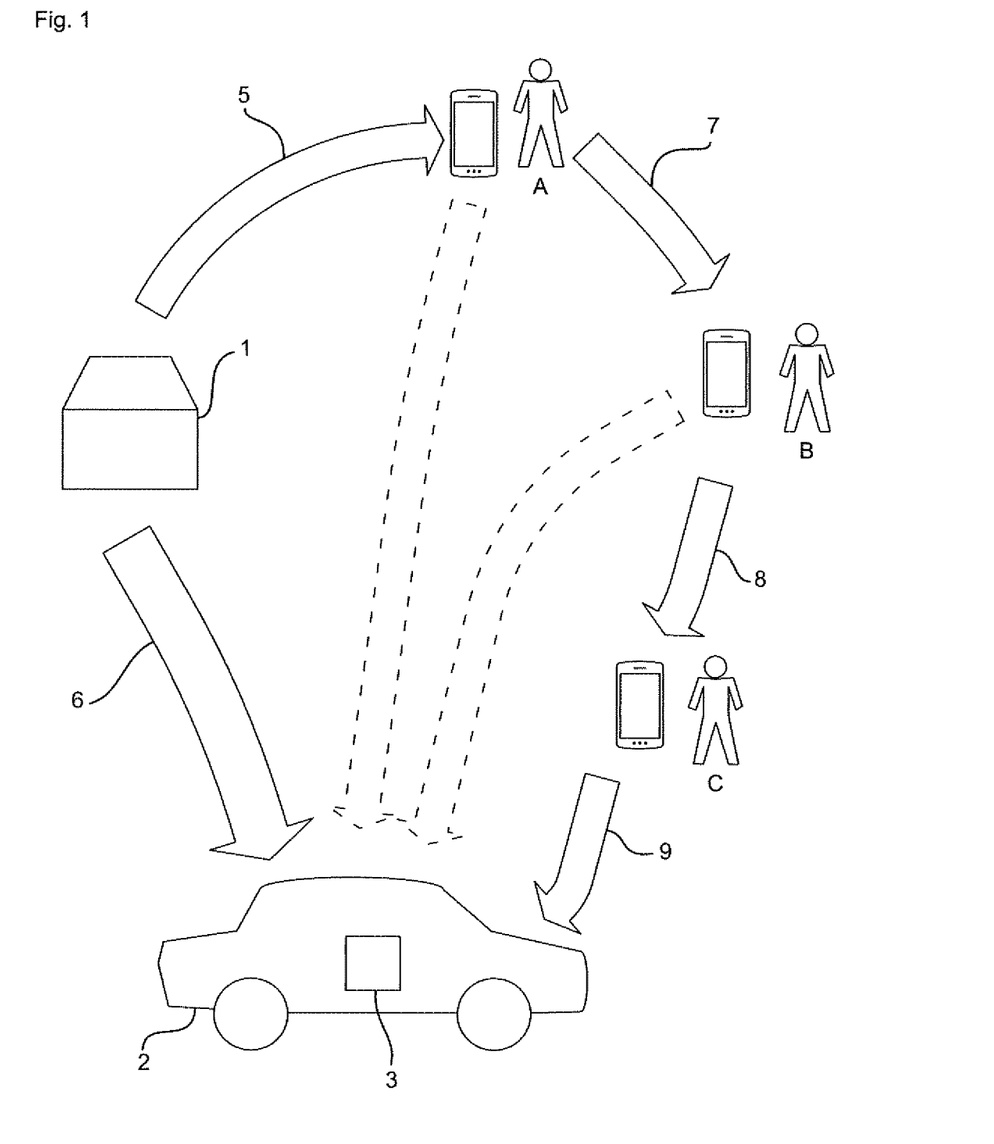
FIG. 1 shows schematically the transmission paths and delegation processes according to a first embodiment of the invention.

FIG. 1 schematically shows the sequence of a delegation of access rights with three users. A central management device 1 is formed by a server which is connected to a communication network. For example, the communication network can be the Internet, which is established via wired and wireless network connections. The protected device in this example is a vehicle 2 in which a control device 3 is disposed. The control device 3 is coupled to the on-board system of vehicle 2 in order to enable or disable access to certain vehicle functions, for example the unlocking of doors and lids or starting the engine. The control device 3 can communicate with the central management device 1, for example via a wireless GSM connection.

Also shown in FIG. 1 are three users of different hierarchy levels. User A is a first-order user, user B is a second-order user, and user C is a third-order user. This means that user A delegates to user B rights to use vehicle 2. User B in turn delegates rights to user C to use vehicle 2. Accordingly, users B and C are hierarchically subordinate to user A because they derive their rights from user A's delegation. User C is subordinate to both users A and B, since he derives his rights from the rights of user A and from the delegated rights of user B.

In FIG. 1, the flow of communication paths is shown schematically. According to this exemplary embodiment, first of all a first-order data packet is generated in the trustworthy central management device 1 and transmitted to user A via path 5. The transmission does not take place to the person of user A but to a first mobile communication device used by him, namely in this case a mobile phone. In addition, the first data packet is transmitted to vehicle 2, more precisely to the control device 3, via connection path 6. Now user A and the control device 3 are both in possession of corresponding information about the access rights via his first mobile communication device.

In principle, user A could now make contact with the control device 3 of the vehicle concerning access using his first mobile communication device, in which case the stored information on his first mobile communication device would be compared with the information received via path 6 in the control device 3 and the access rights would be granted. Such a process is well known in the art. According to the invention, however, user A is able to transfer his rights in whole or in part to user B with his second mobile communication device. For this purpose, user A will create a data packet and transmit this to the second mobile communication device via data path 7. In particular, data path 7 may be a Bluetooth connection between the first mobile communication device of user A and the second mobile communication device of user B. User B would now also basically have access to vehicle 2, as set forth in the above description. However, in this exemplary embodiment, the second-order user, that is to say user B, uses the options for further delegation of parts of his access rights to user C. For this purpose, using his second mobile communication device, user B transmits a data packet created by the second mobile communication device via data connection 8 to the third mobile communication device of user C. User C then initiates a coupling between his third mobile communication device and the control unit 3 via data connection 9, which is for example also a Bluetooth connection, and transmits the data packet in his possession. The control device 3 is able to verify the derivation of the rights of user C from the users B and A, as shown in the following figure. It is essential that the control device 3 in this embodiment is informed, via connection 6 only, about the rights assignment to user A, but not on the delegation of rights from A to B or B to C.

Figure 2:
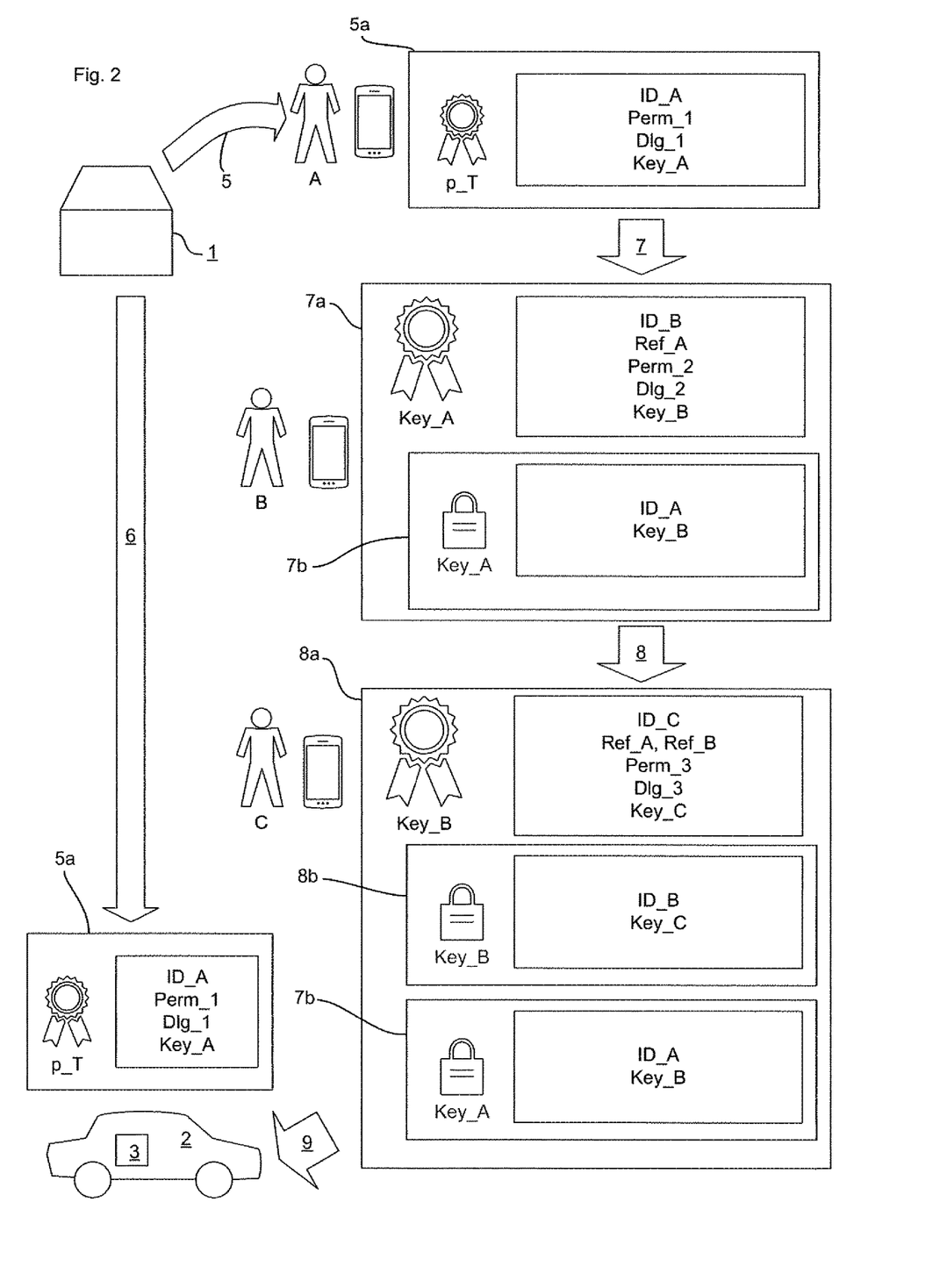
FIG. 2 shows the creation and transmission of the data packets according to the first exemplary embodiment in a schematic view.

FIG. 2 schematically shows the contents of the data packets, which are shown by arrows in FIG. 1.

Data packet 5a is a first-order data packet and is generated in the trusted central management device 1 and transmitted to the first mobile communication device of user A via transmission path 5. This data packet 5a is signed with a certificate p_T by the trusted central management device, so that the first mobile communication device of user A can verify the origin and integrity of data packet 5a. Data packet 5a contains a unique first identifier ID_A and a first data set Perm_1 which contains a list of access rights to vehicle 2, Corresponding to the first data set Perm_1, a data set with delegation authorizations Dlg_1 is also included. This dataset with delegation rights determines which of the permissions Perm_1 may be delegated to subordinate users. In this way, the central management device 1 can fundamentally limit the rights for forwarding user rights. Finally, data packet 5a contains a first data secret Key_A. Data packet 5a is also transmitted from the central management device 1 to the control device 3 of vehicle 2 via data path 6. It should be noted in this connection that although both units, that is on the one hand the control device 3 and on the other hand the first mobile communication device of user A, receive the same user data, but they may well be included in different larger data units. For example, the transmission on path 5 can be made in the context of a periodic update notification, for example several times a day, by the central management device 1 to the control device 3.

User A is now basically able to access vehicle 2 with data packet 5a on his first mobile communication device. However, this is not the subject of the invention, since it corresponds to an access according to the prior art.

According to the invention, user A delegates parts of his rights to user B. For this purpose, a data packet 7a is generated in the first mobile communication device and transmitted to user B, more precisely to his second mobile communication device. Data packet 7a generated in the first mobile communication device contains a unique second identifier ID_B and a reference Ref_A to data packet 5a. The reference indicates the data package from which the legal delegation was derived. In addition, a second data set Perm_2 with associated delegation restrictions Dlg_2 is contained in data packet 7a, the second data set indicating which access rights to vehicle 2 user B, who is in the possession of data packet 7a, is to have. Finally, a second data secret Key_B is attached which is required if the user wants to further delegate his rights.

In addition, data packet 7a contains a data container 7b, which is encrypted with data secret Key_A. Data container 7b is thus unreadable for the second mobile communication device of user B, since this does not have the key Key_A. The encrypted data container 7b contains the unique identifier of the first data packet 5a ID_A and the second data secret Key_B. The entire data packet 7a is signed with the data secret Key_A.

The user B now wants to delegate parts of his access rights to vehicle 2 to a user C. For this purpose, user B generates a data packet 8a using his second mobile communication device and transmits this via the data connection 8 to a third mobile communication device of user C. Data packet 8a contains a unique third identifier ID_C and references both to the first data packet 5a and to the first second data packet 7a. Thus, the reference data indicate the derivation of the rights in the form of a hierarchical list sequence. Furthermore, access rights of user C to vehicle 2 are defined in a third data set Perm_3, as well as delegation authorizations Dlg_3 assigned to the access rights and a data secret Key_C.

Data packet 8a also contains data container 7b, which it receives largely unchanged from data packet 7a, as well as a new data container 8b, which is encrypted with the second data secret Key_B and which contains the second identifier ID_B and the data secret Key_C. The entire data packet 8a is signed with the second data secret Key_B.

In this exemplary embodiment, user C now approaches vehicle 2 with his third mobile communication device and transmits data packet 8a to the control device 3 via the data connection 9.

The control device 3 is in possession of data packet 5a, which was previously transmitted by the central management device via data connection 6. The control device 3 is initially unable to verify the signature of data packet 8a because it is not in possession of the second data secret Key_B. However, the first data secret Key_A is present in the control device 3. Since the data shown in FIG. 2 in data packet 8a on top are signed but not encrypted, the control device 3 can read out the references Ref_A and Ref_B. The control device 3 accordingly calls up the contents of data packet 5a, since this is uniquely referenced by the reference information Ref_A. Then, the control device 3 uses the information of the first data secret Key_A from the referenced data packet 5a to decrypt data container 7b. It can then be verified whether the unique identifier in the encrypted data packet corresponds to the unique identifier of data packet 5a, ID_A. If this is the case, the second data secret Key_B from data container 7a can be used to decrypt data container 8b. Again, it can be checked whether the unique identifier ID_B with the reference value Ref_B refers to the same packet. In addition, the signature of data packet 8a can be verified with the data secret Key_B.

In this way, since a chain of trusted encryptions has been established, the controller 3 then trusts the contents of data packet 8a and enters the access rights Perm_3 as access rights of user C using his third mobile communication device. However, this only works insofar as the access rights are consistent with the permitted delegation of access rights that are in the delegation list Dlg_1.

In view of this representation, it is clear that in each stage of the rights delegation an encrypted container is added whose contents cannot be viewed or changed by a hierarchically lower user, but this container is used by the control device 3 to verify the rights. The signatures of all the data packets may only be successfully verified by the control device 3 when one of the data containers representing the origin of the rights hierarchy, is to be decrypted by the data of the control device 3 which has received these data from the central trusted management device 1.

It is also clear that the granting of rights of user A to user B and from user B to user C takes place without the involvement of the central management device 1 and likewise without the involvement of the control device 3.

Figure 3:
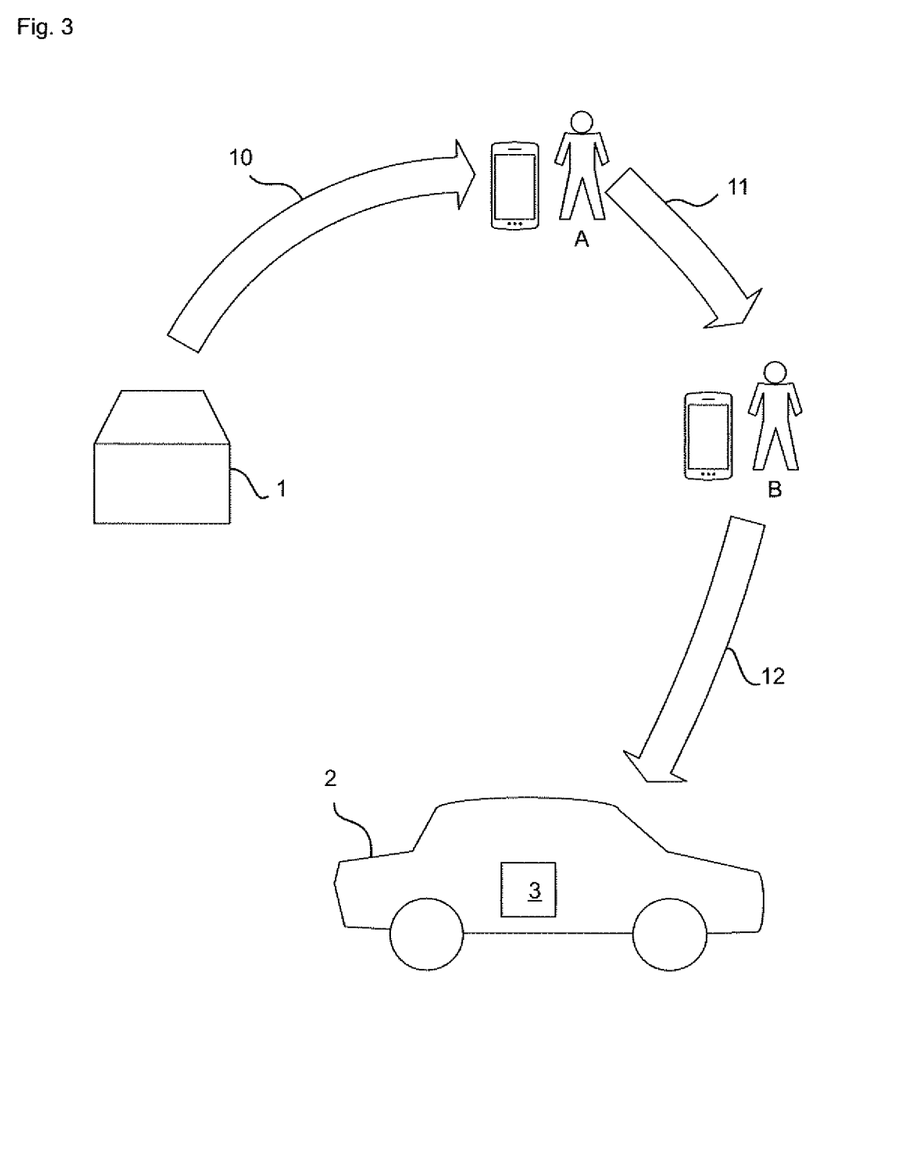
FIG. 3 shows schematically the transmission paths and delegation processes according to a second embodiment of the invention.

FIG. 3 shows an embodiment of the invention according to a second embodiment and aspect of the invention. In this schema, it can be seen that the rights delegation only takes place from one user to another user, but there is no data connection between the central trusted management device 1 and vehicle 2 and its control device 3. For example, the vehicle 2 can be in an underground garage and cannot access the communication networks.

In this example, a data packet is transmitted from the central management device 1 via data transmission path 10 to the first mobile communication device of user A. From his first mobile communication device, user A delegates usage rights to user B and his second mobile communication device via data transmission path 11. User B then accesses the control device 3 of vehicle 2 using a second mobile communication device via data path 12.

Figure 4:
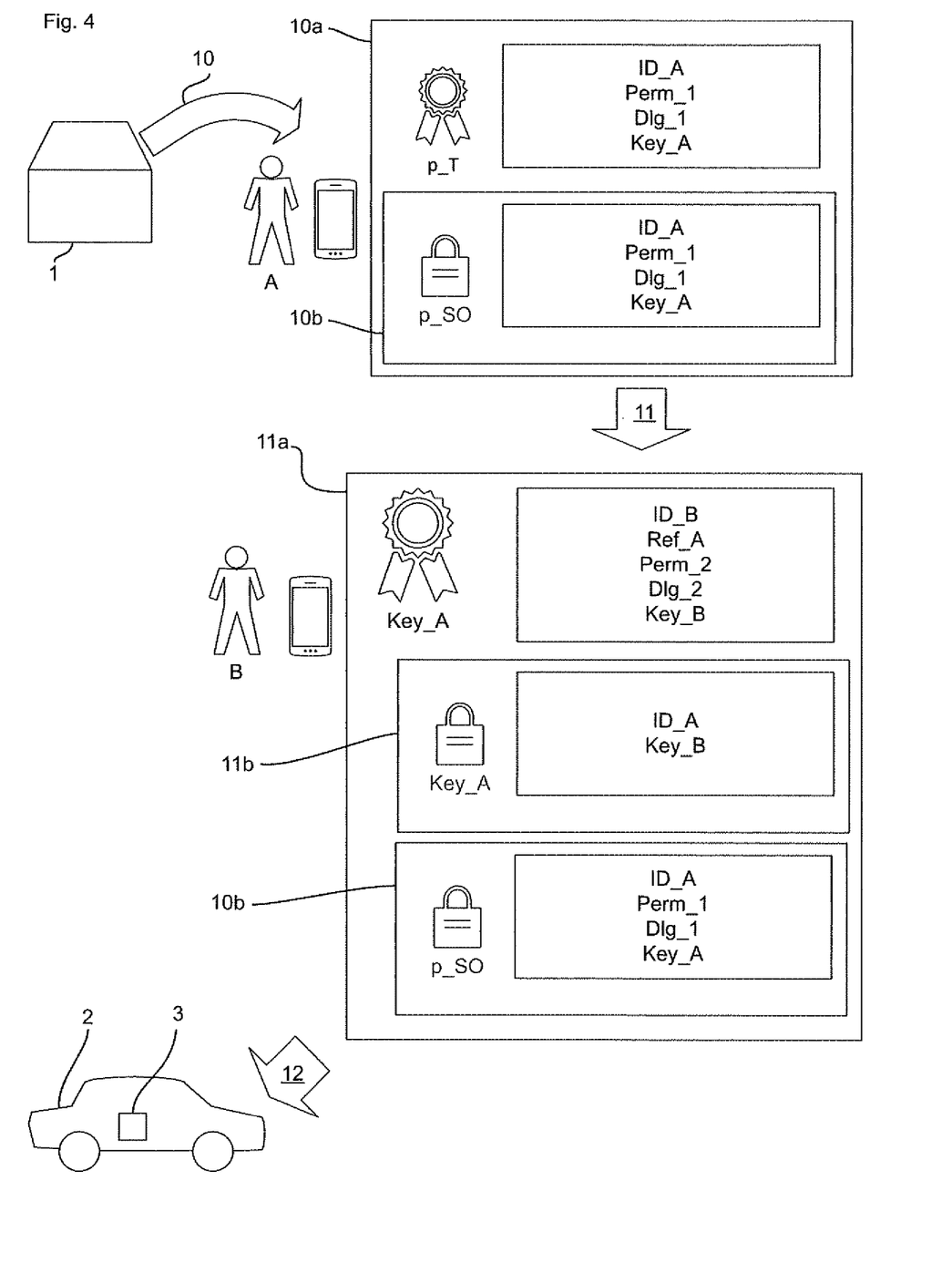
FIG. 4 shows the creation and transmission of the data packets according to the second exemplary embodiment in a schematic view.

FIG. 4 shows the packet contents of the exemplary embodiment according to the second aspect of the invention.

As in the first exemplary embodiment, in particular FIG. 2 there, with his first mobile communication device user A receives a data packet 10a via data path 10 from the central management device 1. On one hand, this packet contains a data set as in the embodiment described above, namely containing a unique first identifier ID_A, a first list of access rights Perm_1 and associated delegation permissions Dlg_1 and a first data secret Key_A. This information is provided with a signature p_T of the trusted central management device 1.

In addition to the foregoing embodiment, however, an encrypted data container 10b is included in data packet 10a. This encrypted data container 10b is unreadably encrypted for the first mobile communication device of user A with a first object data secret p_So, which is matched to the control device 3 of vehicle 2. For example, this key is a key which is stored in the control device 3 and is known to the trustworthy central management device 1, but not to the first mobile communication device. This data container 10b serves to provide the control device 3 with the contents of the data packet if no direct connection between the central management device 1 and the control device 3 is possible. Data path 5 shown in the first exemplary embodiment is accordingly not available here, so that the contents of the data packet for the control device 3 is encrypted and integrated into data packet 10a. Via data path 11, for example a Bluetooth connection, user A can grant user B access rights to vehicle 2 using his first mobile communication device. Data packet 11a is created for this purpose, which contains values generated by the first mobile communication device. In particular, a unique second identifier ID_B is included. In addition, a reference Ref_A is present in the first data packet 10a. Furthermore, a list of access permissions Perm_2 and associated delegation rights Dlg_2 is included, and a second data secret Key_B. Data container 10b, which is encrypted with the first object data secret p_SO, is likewise contained in data packet 11a, as is a data container 11b which is encrypted with the first data secret Key_A and which contains the unique first identifier ID_A and the second data secret Key_B. The entire data packet 11a is signed with the first data secret Key_A.

User B now enters into a communication link 12 with the controller 3 using his second mobile communication device. The controller 3 is at this time completely in ignorance of the delegation of rights as well as the existing access rights of user A, since data packet 10a has not yet been received here. The control device 3 now analyzes the contents of data packet 10a. For this purpose, data container 10b is decrypted using the second object data secret already present in the control device 3, the data secret containing the key p_So. If this is successful, the control device 3 has the content of data packet 10a and can now process the remainder of the information as explained in the preceding exemplary embodiment. Namely, the control device 3 is now able to store the rights of user A by way of container transport. However, it is also possible to decrypt the second container 11b and to check the signature of data packet 11a by way of the stored first data secret Key_A which has been decrypted from data container 10b. In the above example, the delegation of the rights of user A to user B can then be checked in the control device 3, and user B can be granted the corresponding access rights.

It can be seen that in the embodiment according to FIGS. 1 and 2 as well as in the embodiment according to FIGS. 3 and 4, as many further hierarchy levels can follow as desired, in which case encrypted data containers with different data secrets are then added. For clarity, however, the representation in this case has been limited to three users and two users, respectively.

The invention claimed is:

1. A method for delegating access rights to a secured object, comprising the steps of:
providing a first-order data packet in a trusted central management device, wherein the first-order data packet includes:
a unique first identifier,
a first data set with a list of access rights to a secured device,
a first data secret key, which can be used for the encryption and decryption of data,
transmitting the first-order data packet to a first mobile communication device assigned to a first-order user,
transmitting the first-order data packet to a control device of the secured device and storing the first-order data packet in the control device;
providing a second-order data packet in the first mobile communication device, wherein the second-order data packet includes:
a unique second identifier,
first reference data containing a reference to the first-order data packet,
a second data set with a list of access rights to the secured device, the second data set being a subset of the first data set,
a second data secret key, which can be used for encryption and decryption of data,
a first data container encrypted with the first data secret key and containing at least the unique first identifier and the second data secret key,
signing the second-order data packet using the first data secret key,
transmitting the signed second-order data packet to a second mobile communication device associated with a second-order user, wherein the second communication device is hierarchically subordinate to the first communication device.

2. The method of claim 1, wherein the first data set with a list of access rights includes delegation permissions associated with the access information, the permissions indicating which of the listed access rights can be delegated to hierarchically subordinate communication devices.

3. The method of claim 1, wherein the first data secret key and/or the second data secret key each comprises a plurality of components, so that for encryption using any data secret key a different component of the data secret key can be used than for the signature using the respective data secret key.

4. The method according to claim 1, further comprising the steps of:
providing a third-order data packet in the second mobile communication device, wherein the third-order data packet contains at least:
a unique third identifier,
second reference data which contain a reference to at least one of the first-order and/or second-order data packets,
a third data set listing access rights to a secured device, wherein the third data set is a subset of the second data set,
the first data container encrypted with the first data secret key,
a second data container encrypted with the second data secret key and containing at least the unique second identifier,
signing the third-order data packet using the second data secret, key,
transmitting the signed third-order data packet to a third mobile communication device associated with a third-order user subordinate to the second-order user.

5. The method according to claim 1, comprising the steps of:
transmitting the second-order data packet from the second mobile communication device to the secured device controller;
reading out the first reference data and calling up the contents of the first-order data packet referenced by the first reference data and stored in the control device,
verifying the signature of the second-order data packet using the first data secret key,
decrypting the first data container in the control device using the first data secret key from the first-order data packet,
verifying the first identifier from the decrypted first data container using the identifier from the first-order data packet stored in the control device,
verifying the access rights from the second data set using the access rights from the first data set,
registering the access rights from the second data set as access rights of the second communication device if all verifications were successful.

6. The method according to claim 4, comprising the steps of:

transferring the third-order data packet from the third mobile communication device to the control device of the secured device, reading the second reference data and calling up the contents of the first-order data packet referenced by the second reference data and stored in the control device, decrypting the first data container in the control device using the first data secret from the first-order data packet, verifying the signature of the third-order data packet using the second data secret key from the decrypted first data container, verifying the first identifier from the decrypted first data container using the identifier from the first-order data packet stored in the control device, verifying the access rights from the third data set using the access rights from the first data set, registering the access rights from the third data set as access rights of the third communication device if all verifications were successful.

7. A method for delegating access rights to a secured object, comprising the steps of:

providing a first-order data packet in a trusted central management device, wherein the first-order data packet at least includes:
   a unique first identifier,
   a first data set with a list of access rights to a secured device,
   a first data secret key, which can be used for the encryption and decryption of data, encrypting the first-order data packet in the trusted central management device, wherein a first object data secret specific to the secured object is used for encryption, the first object data secret being matched to a second object data secret stored in the control device of the secured object such that the first-order data packet encrypted using the first object data secret can be decrypted for the control device of the secured object, transmitting both the unencrypted first-order data packet and the first-order data packet encrypted using the first object data secret to a first mobile communication device assigned to a first-order user;

providing a second-order data packet in the first mobile communication device, wherein the second-order data packet includes:
   a unique second identifier,
   first reference data containing a reference to the first-order data packet,
   a second data set with a list of access rights to the secured device, the second data set being a subset of the first data set,
   a second data secret key, which can be used for encryption and decryption of data,
   the first-order data packet encrypted using the first object data secret,
   a first data container encrypted with the first data secret key and containing at least the unique first identifier and the second data secret key, signing the second-order data packet using the first data secret key, transmitting the signed second-order data packet to a second mobile communication device associated with a second-order user, wherein the second communication device is hierarchically subordinate to the first communication device.

8. The method of claim 7, wherein the first data set with a list of access rights includes delegation permissions associated with the access information, the permissions indicating which of the listed access rights can be delegated to hierarchically subordinate communication devices.

9. The method according to claim 7, wherein the first data secret and/or the second data secret each comprises a plurality of components so that for encryption using any data secret a different component of the data secret can be used than for the signature using the respective data secret.

10. The method according to claim 7, further comprising the steps of:

providing a third-order data packet in the second mobile communication device, wherein the third-order data packet contains:
   a unique third identifier,
   second reference data which contain a reference to at least one of the first-order and/or second-order data packets,
   a third data set listing access rights to a secured device, wherein the third data set is a subset of the second data set,
   the first-order data packet encrypted using the first object data secret,
   the first data container encrypted with the first object data secret,
   a second data container encrypted with the second object data secret and containing at least the unique second identifier, signing the third-order data packet using the second object data secret, transmitting the signed third-order data packet to a third mobile communication device associated with a third-order user subordinate to the second-order user.

11. The method according to claim 7, comprising the steps of:

transmitting the second-order data packet from the second communication device to the control device of the secured device;

decrypting the first-order data packet encrypted using the first object data secret in the control device using the second object data secret, verifying the signature of the second-order data packet using the first object data secret, decrypting the first data container in the control device using the first object data secret from the first-order data packet, verifying the first identifier from the decrypted first data container using the identifier from the first-order data packet stored in the control device, verifying the access rights from the second data set using the access rights from the first data set, registering the access rights from the second data set as access rights of the second communication device if all verifications were successful.

12. The method according to claim 7, comprising the steps of:

transmitting the third-order data packet from the third communication device to the control device of the secured device;

decrypting the first-order data packet encrypted using the first object data secret in the control device using the second object data secret, decrypting the first data container in the control device using the first object data secret from the first-order data packet, verifying the signature of the third-order data packet using the second object data secret from the decrypted first data container, verifying the first identifier from the decrypted first data container using the identifier from the first-order data packet stored in the control device,
verifying the access rights from the third data set using the access rights from the first data set,
registering the access rights from the third data set as access rights of the third communication device if all verifications were successful.

\* \* \* \* \*